(12) United States Patent
Parandehgheibi et al.

(10) Patent No.: US 10,554,501 B2
(45) Date of Patent: Feb. 4, 2020

(54) NETWORK MIGRATION ASSISTANT

(71) Applicant: Cisco Technology, Inc., San Jose, CA (US)

(72) Inventors: Ali Parandehgheibi, Sunnyvale, CA (US); Ashutosh Kulshreshtha, San Jose, CA (US); Michael Watts, Mill Valley, CA (US); Navindra Yadav, Cupertino, CA (US); Vimal Jeyakumar, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 137 days.

(21) Appl. No.: 15/790,412

(22) Filed: Oct. 23, 2017

(65) Prior Publication Data

US 2019/0123972 A1     Apr. 25, 2019

(51) Int. Cl.
*G06F 15/173*     (2006.01)
*H04L 12/24*      (2006.01)
*G06F 9/48*       (2006.01)

(52) U.S. Cl.
CPC .......... *H04L 41/145* (2013.01); *G06F 9/4856* (2013.01)

(58) Field of Classification Search
CPC ............................ H04L 41/145; G06F 9/4856
USPC ........................................................ 709/224
See application file for complete search history.

(56) References Cited

U.S. PATENT DOCUMENTS

| | | |
|---|---|---|
| 5,086,385 A | 2/1992 | Launey et al. |
| 5,319,754 A | 6/1994 | Meinecke et al. |
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |

(Continued)

FOREIGN PATENT DOCUMENTS

| | | |
|---|---|---|
| CN | 101093452 | 12/2007 |
| CN | 101770551 | 7/2010 |

(Continued)

OTHER PUBLICATIONS

Arista Networks, Inc., "Application Visibility and Network Telemtry using Splunk," Arista White Paper, Nov. 2013, 11 pages.

(Continued)

*Primary Examiner* — Wing F Chan
*Assistant Examiner* — Joseph R Maniwang
(74) *Attorney, Agent, or Firm* — Polsinelli PC

(57) ABSTRACT

The disclosed technology relates to assisting with the migration of networked entities. A system may be configured to collect operations data for a service from at least one endpoint host in a network, calculate at least one metric for the service based on the operations data, retrieve a migration configuration and platform data for a target platform, generate a predicted cost for the migration configuration based on the migration configuration, the at least one metric, and the platform data, and provide the predicted cost for the migration configuration to a user.

19 Claims, 5 Drawing Sheets

(56) References Cited

U.S. PATENT DOCUMENTS

| | | | |
|---|---|---|---|
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,546,420 B1 | 4/2003 | Lemler et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |

(56) References Cited

U.S. PATENT DOCUMENTS

| | | |
|---|---|---|
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 6/2016 | Shimomura et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |

(56) References Cited

U.S. PATENT DOCUMENTS

| | | |
|---|---|---|
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |

(56) References Cited

U.S. PATENT DOCUMENTS

| | | |
|---|---|---|
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156813 A1* | 6/2014 | Zheng ............... H04L 67/16 709/220 |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0279201 A1* | 9/2014 | Iyoob ............... G06Q 30/0631 705/26.7 |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058486 A1* | 2/2015 | Huang ............... H04L 47/70 709/226 |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | MacKay et al. |
| 2015/0295945 A1 | 10/2015 | Canzanese, Jr. et al. |
| 2015/0312233 A1 | 10/2015 | Graham, III et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1* | 12/2016 | Gupta ............... G06F 21/552 |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |

(56) References Cited

U.S. PATENT DOCUMENTS

| | | |
|---|---|---|
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0149875 A1* | 5/2017 | Iyengar .............. H04L 67/1012 |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, tiled Jan. 21, 2015, entitled "Monitoring Network Policy Compliance."

Bosch, Greg, "Virtualization," 2010, 33 pages.

Breen, Christopher, "MAC 911, How to dismiss Mac App Store Notifications," Macworld.com, Mar. 24, 2014, 3 pages.

Chandran, Midhun, et al., "Monitoring in a Virtualized Environment," GSTF International Journal on Computing, Vol. 1, No. 1, Aug. 2010.

Chari, Suresh, et al., "Ensuring continuous compliance through reconciling policy with usage," Proceedings of the $18^{th}$ ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Chou, C.W., et al., "Optical Clocks and Relativity," Science vol. 329, Sep. 24, 2010, pp. 1630-1633.

Cisco Systems, "Cisco Network Analysis Modules (NAM) Tutorial," Cisco Systems, Inc., Version 3.5.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Systems, Inc., "Cisco Application Visibility and Control," Oct. 2011, 2 pages.

Cisco Systems, Inc., "Cisco Tetration Platform Data Sheet", Updated Mar. 5, 2018, 21 pages.

Cisco Technology, Inc., "Cisco Lock-and-Key:Dynamic Access Lists," http://www/cisco.com/c/en/us/support/docs/security-ypn/lock-key/7604-13.html; Updated Jul. 12, 2006, 16 pages.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Duan, Yiheng, et al., Detective: Automatically Identify and Analyze Malware Processes in Forensic Scenarios via DLLs, IEEE ICC 2015—Next Generation Networking Symposium, pp. 5691-5696.

Feinstein, Laura, et al., "Statistical Approaches to DDoS Attack Detection and Response," Proceedings of the DARPA Information Survivability Conference and Exposition (DISCEX '03), Apr. 2003, 12 pages.

George, Ashley, et al., "NetPal: A Dynamic Network Administration Knowledge Base," 2008, pp. 1-14.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.

Heckman, Sarah, et al., "On Establishing a Benchmark for Evaluating Static Analysis Alert Prioritization and Classification Techniques," IEEE, 2008; 10 pages.

(56) References Cited

OTHER PUBLICATIONS

Hewlett-Packard, "Effective use of reputation intelligence in a security operations center," Jul. 2013, 6 pages.
Hideshima, Yusuke, et al., "Starmine: A Visualization System for Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015, https://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection," IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles On Line Using sFlow," in Proceedings of the first edition workshop on High performance and programmable networking, 2013, ACM, New York, NY, USA, 53-60.
Liu, Ting, et al., "Impala: A Middleware System For Managing Autonomic, Parallel Sensor Systems," In Proceedings of the Ninth ACM SIGPLAN Symposium On Principles And Practice Of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfallgroup.com/products/it-continuity-architect.

Nilsson, Dennis K., et al., "Key Management And Secure Software Updates In Wireless Process Control Environments," In Proceedings of the First ACM Conference On Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. Sep. 13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Thomas, R., "Bogon Dotted Decimal List," Version 7.0, Team Cymru NOC, Apr. 27, 2012, 5 pages.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper SRX Series" Jun. 17, 2013, 1 page, O'Reilly Media, Inc.
Zatrochova, Zuzana, "Analysis and Testing of Distributed NoSQL Datastore Riak," Spring, 2015, 76 pages.
Zhang, Yue, et al., "Cantina: A Content-Based Approach to Detecting Phishing Web Sites," May 8-12, 2007, pp. 639-648.
Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Baek, Kwang-Hyun, et al., "Preventing Theft of Quality of Service on Open Platforms," 2005 Workshop of the 1$^{st}$ International Conference on Security and Privacy for Emerging Areas in Communication Networks, 2005, 12 pages.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.
Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b),

(56) References Cited

OTHER PUBLICATIONS

NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing And Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repostorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Voris, Jonathan, et al., "Bait and Snitch: Defending Computer Systems with Decoys," Columbia University Libraries, Department of Computer Science, 2013, pp. 1-25.
Zeng, Sai, et al., "Managing Risk in Multi-node Automation of Endpoint Management," 2014 IEEE Network Operations and Management Symposium (NOMS), 2014, 6 pages.

\* cited by examiner

NETWORK MIGRATION ASSISTANT

TECHNICAL FIELD

The subject matter of this disclosure relates in general to the field of computer networks, and more specifically for management of networked entities and resources.

BACKGROUND

A network administrator may be responsible for managing a large number of networked entities and resources distributed across one or more networks. These entities may be physical entities or logical entities. For example, the entities may include nodes, endpoints, machines, virtual machines, containers (an instance of container-based virtualization), tenants, endpoint groups, and applications. In addition to being different types, these entities may be grouped in various ways, located in different geographical locations, and/or serve different functions. The networked entities may be configured across one or more networks in many different ways and each configuration may have certain advantages and disadvantages with respect to performance, cost, etc.

In some cases, a network administrator may wish to alter the configuration of the networked entities by, for example, migrating one or more networked entities from one network to another. For example, some service providers provide one or more cloud services platforms that allow a network administrator to migrate networked entities to or from a cloud service platform. However, the decision to migrate networked entities from one network to another is a difficult one. Traditional approaches for managing large networks and determining whether and how to migrate certain entities require comprehensive knowledge on the part of highly specialized human operators because of the complexities of the networks, platforms, entities, and the interrelationships among the entities.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
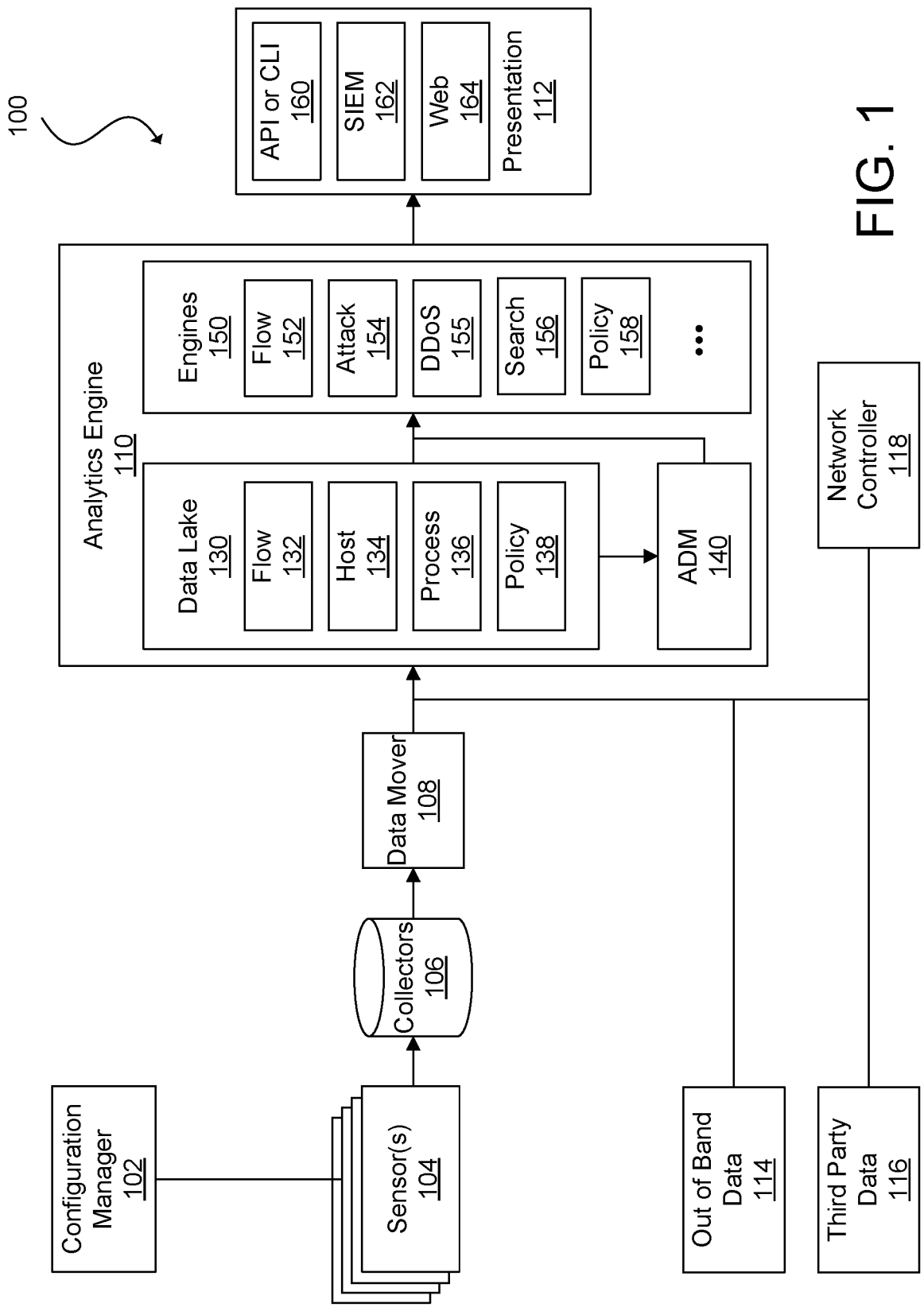
FIG. 1 is a conceptual block diagram illustrating an example network migration system, in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Various aspects of the subject technology relate to assisting with the migration of networked entities. A system may be configured to collect operations data for a service from at least one endpoint host in a network, calculate at least one metric for the service based on the operations data, retrieve a migration configuration and platform data for a target platform, generate a predicted cost for the migration configuration based on the migration configuration, the at least one metric, and the platform data, and provide the predicted cost for the migration configuration to a user.

According to some embodiments, a system may be configured to store operations data for a first configuration of a first set of networked entities on at least one source platform, wherein the operations data are associated with a service hosted on the networked entities on the at least one source platform. The system may receive a second configuration for migrating the service from the at least one source platform to at least one destination platform, wherein the at least one destination platform is associated with platform data associated with a second set of networked entities. The system may further generate a predicted cost for the second configuration based on the operations data and the platform data for the at least one destination platform and provide the predicted cost for the migration configuration to a user.

Example Embodiments

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Various embodiments of the subject technology relate to a system configured to assist a network administrator with the possible migration of networked entities from one network to another. The system may provide the network administrator with information, metrics, insights, candidate configurations, or other information that may help the network administrator determine whether to migrate one or more networked entities, how to migrate the one or more entities, predict changes in performance or cost associated with a migration configuration, and/or execute a migration.

A network administrator or a team of network administrators often manage a large number of networked entities.

The entities may include applications, endpoint groups, tenants, virtual machines, or containers. Each of these networked entities has their own performance characteristics, resource requirements, and costs, which may all vary over time. There are also many options for hosting the various networked entities managed by the network administrators. For example, one or more networked entities may be hosted on one or more host platforms. These host platforms may include local machines, one or more machines in one or more enterprise networks, or cloud services platforms provided by third parties.

There are various considerations that network administrators should consider when deciding where to host networked entities. However, because of the complexity and lack of information on the various factors, some of the factors are not adequately considered when determining where to host or migrate networked entities. For example, the network administrators need to consider how a networked entity will perform on the host platform, the cost of hosting each networked entity on the host platform, and how the hosting configuration of the other networked entities will affect the networked entity. These considerations are often hard to predict, especially with respect to a large number of networked entities with a complex web of interoperability and interdependence.

Various embodiments of the subject technology address these and other technical problems by assisting network administrators by providing network administrators with guidance and information about various migration configurations and their associated costs. Aspects may relate to collecting operations data for networked entities and calculating various metrics for the networked entities based on the operations data. One or more migration configurations may be retrieved along with platform data for one or more host platforms. Using these inputs, a predicted cost for each migration configuration may be calculated and provided to a user.

Example embodiments described herein with reference to the accompanying figures provide an improvement to one or more aspects of existing methods and systems for optimizing performance of network migration systems and tools. Network migration plays an important role in the technological field of network management, internet/network security, datacenter technology, and other modern network related technologies that are rooted in computer technologies. Modern datacenter and network configurations are increasingly migrating either entirely or partially to cloud providers. Aspects of the subject technology reduce the time and computing resources (e.g., CPU, bandwidth, memory, etc.) needed to identify how a migration configuration affects the cost, performance, and/or computing resources needed by a data center or other network entity.

FIG. 1 is a conceptual block diagram illustrating an example network migration system 100, in accordance with various embodiments of the subject technology. The network migration system 100 can include a configuration manager 102, sensor(s) 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition can be an instance of a VM, container, sandbox, or other isolated software environment. The software environment can include an operating system and application software. For software running within a virtual partition, the virtual partition can appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 can request for status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that can be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container); a hypervisor or shared kernel managing one or more virtual partitions and/or physical servers, an application-specific integrated circuit (ASIC) of a switch, router, gateway, or other networking device, or a packet capture (pcap) appliance (e.g., a standalone packet monitor, a device connected to a network devices monitoring port, a device connected in series along a main trunk of a datacenter, or similar device), or other entity in a network. The sensors 104 can monitor network traffic between nodes, and send network traffic data and corresponding data (e.g., host data, process data, user data, etc.) to the collectors 108 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition, hypervisor, shared kernel, or physical server, ASIC, pcap, etc.) includes a respective sensor 104. However, it should be understood that various software and hardware configurations can be used to implement the sensor network 104.

As the sensors 104 capture communications and corresponding data, they can continuously send network traffic data to the collectors 108. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data, included as part of gathered network traffic data, for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 108. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 can be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which can be used as additional data points by the analytics engine 110. Further, collecting network traffic and corresponding data from multiple points of view ensures more accurate data is captured. For example, a conventional sensor network can be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors cannot be accurately monitored by the conventional sensor network. The sensor network 104 of various embodiments substantially mitigates or eliminates these issues altogether by locating sensors at multiple points of potential failure. Moreover, the network migration system 100 can verify multiple instances of data for a flow (e.g., source endpoint flow data, network device flow data, and endpoint flow data) against one another.

In some embodiments, the network migration system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source can be more likely to be more accurate than a sensor closer to the destination), a state of a sensor or a node hosting the sensor (e.g., a compromised sensor/node can have less accurate flow data than an uncompromised sensor/node), or flow data volume (e.g., a sensor capturing a greater number of packets for a flow can be more accurate than a sensor capturing a smaller number of packets).

In some embodiments, the network migration system 100 can assemble the most accurate flow data set and corresponding data from multiple sensors. For instance, a first sensor along a data path can capture data for a first packet of a flow but can be missing data for a second packet of the flow while the situation is reversed for a second sensor along the data path. The network migration system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network migration system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it can be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 can only serve as network storage for the network migration system 100. In such embodiments, the network migration system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it can be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set can be retained for a lengthier period of time for another set of flows identified as anomalous or as an attack.

The analytics engine 110 can generate analytics using data collected by the sensors 104. Analytics generated by the analytics engine 110 can include applicable analytics of nodes or a cluster of nodes operating in a network. For example, analytics generated by the analytics engine 110 can include one or a combination of information related to flows of data through nodes, detected attacks on a network or nodes of a network, applications at nodes or distributed across the nodes, application dependency mappings for applications at nodes, policies implemented at nodes, and actual policies enforced at nodes.

In some embodiments, the analytics engine 110 can be used to generate various metrics regarding one or more migration configurations for networked entities. The metrics may relate to a monetary cost, performance metrics, etc. For example, a migration configuration may assign a number of networked entities to one or more host platforms. Based on the information contained in the data lake 130, the analytics engine may determine metrics associated with the placement of each of the networked entities in the migration configuration at the assigned host platform.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as platform data for a host platform, security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 can instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address can correspond to a first endpoint (e.g., network device, physical server, virtual partition, etc.) of the network, and the destination address can correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 can be associated by platform, process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 can include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine can be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 can further include a search engine 156. The search engine 156 can be configured, for example to perform a structured search, an NLP (Natural Language Processing) search, or a visual search. Data can be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic can correspond to an application, and the intercon-nectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 can analyze the input data to determine that there is first traffic flowing between external endpoints on port 80 of the first endpoints corresponding to Hypertext Transfer Protocol (HTTP) requests and responses. The input data can also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 can define an ADM for the web application as a three-tier application including a first EPG comprising the first endpoints, a second EPG comprising the second endpoints, and a third EPG comprising the third endpoints.

The presentation module 116 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it can be too voluminous for a user to navigate. The presentation module 116 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an API for the programming language Java®, which defines how a client can access a database.

In some embodiments, the SIEM interface 162 can be implemented using Hadoop® Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network migration system, those of skill in the art will understand that the components of the network migration system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
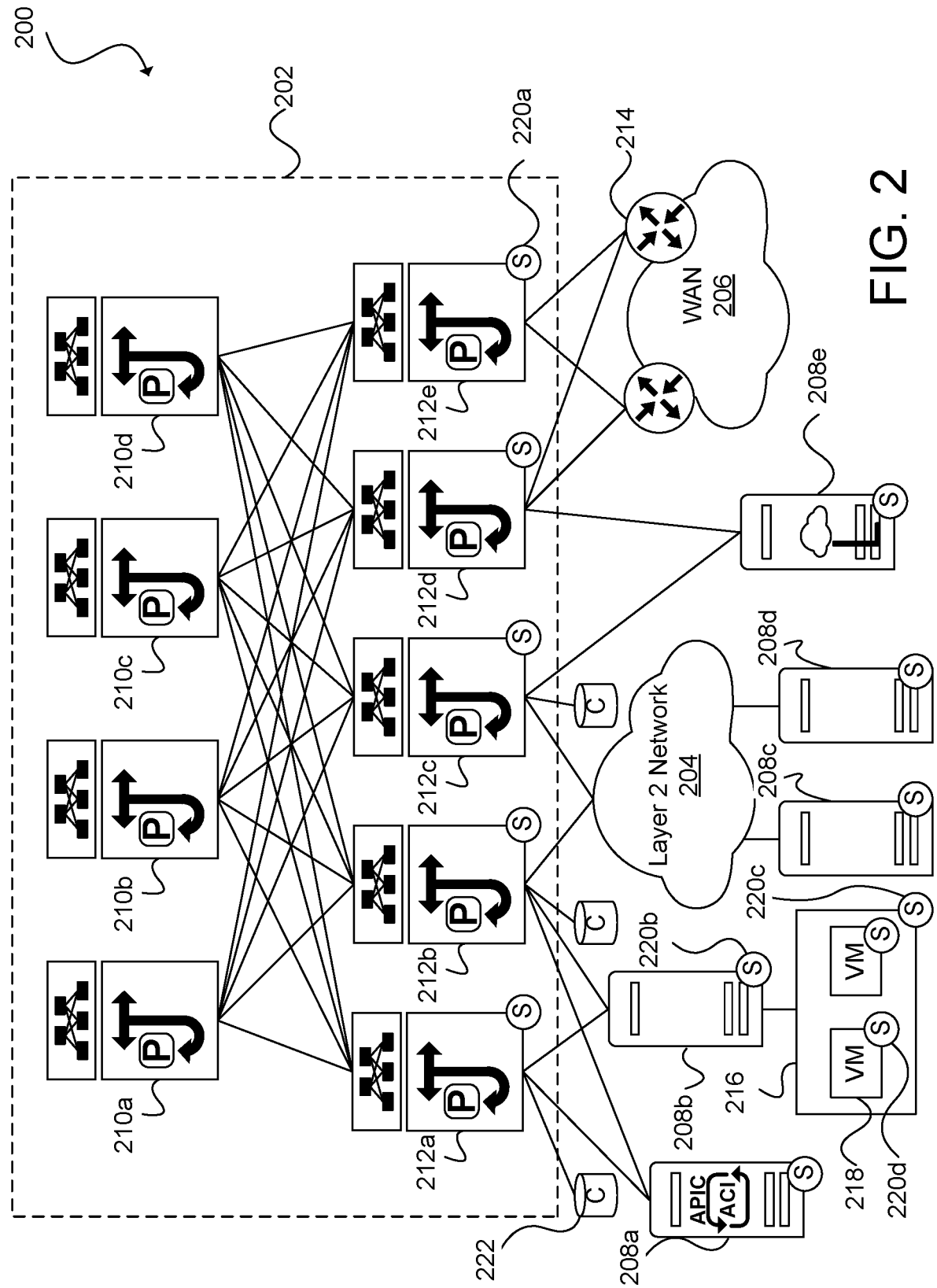
FIG. 2 illustrates an example of a network environment, in accordance with an embodiment.

FIG. 2 illustrates an example of a network environment 200, in accordance with an embodiment. In some embodiments, a network migration system, such as the network migration system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e can be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any datacenter or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and can accommodate a large number of components, as well as more complicated arrangements and configurations. For example, the network can include any number of fabrics 202, which can be geographically dispersed or located in the same geographic area. Thus, network nodes can be used in any suitable network topology, which can include any number of servers, virtual machines or containers, switches, routers, appliances, controllers, gateways, or other nodes interconnected to form a large and complex network. Nodes can be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 can have instantiated thereon a hypervisor 216 for creating and running one or more virtual switches (not shown) and one or more virtual machines 218, as shown for the host 208b. In other embodiments, physical servers can run a shared kernel for hosting containers. In yet other embodiments, the physical server 208 can run other software for supporting other virtual partitioning approaches. Networks in accordance with various embodiments can include any number of physical servers hosting any number of virtual machines, containers, or other virtual partitions. Hosts can also comprise blade/physical servers without virtual machines, containers, or other virtual partitions, such as the servers 208a, 208c, 208d, and 208e.

The network environment 200 can also integrate a network migration system, such as the network migration system 100 shown in FIG. 1. For example, the network migration system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host can include multiple sensors 220 running on the host (e.g., the host sensor 220b) and various components of the host (e.g., the hypervisor sensor 220c and the VM sensor 220d) so that all (or substantially all) packets traversing the network environment 200 can be monitored. For example, if one of the VMs 218 running on the host 208b receives a first packet from the WAN 206, the first packet can pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

The network migration system 100 shown in FIG. 1 can be used to gather network traffic data and generate analytics for networked entities. Specifically, the network migration system 100 can gather network traffic data and generate analytics for networked entities within one or more networks or host platforms. Although FIG. 2 illustrates one network environment 200, in some embodiments, a network migration system may communicate with multiple network environments (e.g., other host platforms) and/or multiple network fabrics.

In some cases, a network administrator may wish to migrate applications, services, or other networked entities from one host platform to another. Migration may allow for reduce costs, increased performance, improved scalability, or other advantages.

Figure 3:
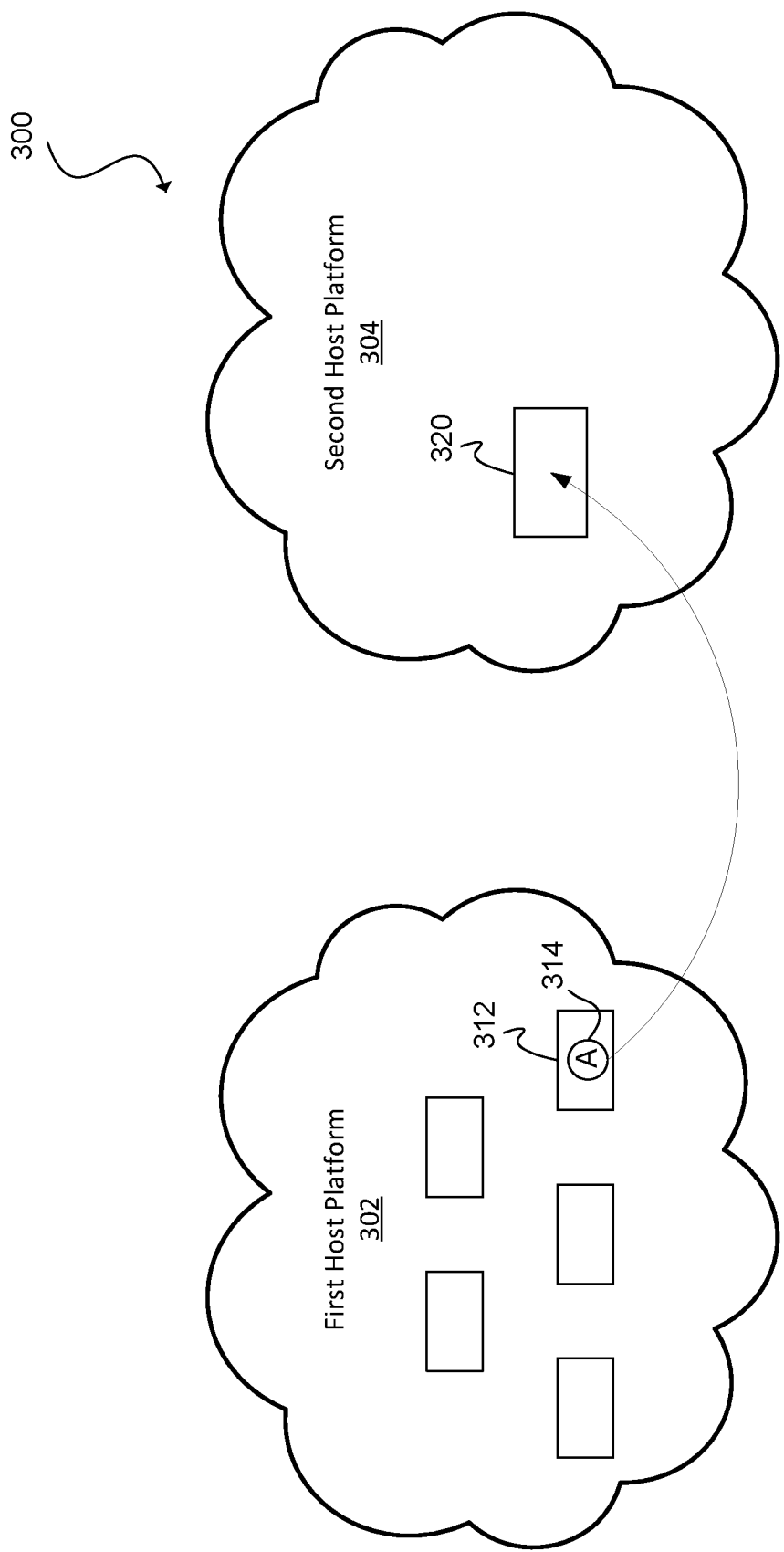
FIG. 3 illustrates an example of a network environment for migration, in accordance with an embodiment.

FIG. 3 illustrates an example of a network environment 300 for migration, in accordance with an embodiment. The network environment 300 includes a first host platform 302 and a second host platform 304 for illustrative purposes with the understanding that additional host platforms are also contemplated. The first host platform 302 may be, for example, an enterprise network while the second host platform 304 may be a cloud services platform provided by a third party.

The network administrator may contemplate a migration configuration for migrating application 314, currently hosted on one or more machines 312 or virtual machines (VMs) of the first host platform 302, to one or more machines 320 or host machines of the second host platform 304. Although FIG. 3 illustrates application 314 being hosted by a single machine 312 or virtual machine, in some cases, the application may be hosted by multiple machines or VMs on a source host platform and can be migrated to multiple machines or VMs on a destination host platform. Furthermore, the machines/VMs on the source host platform may have different specifications and capabilities from the machines/VMs on the destination host platform.

According to various embodiments of the subject technology, the migration of the application 314 from the source host platform to the destination host platform is not a mere cloning of a machine on the source host platform onto a machine on the destination host platform. In many cases, each machine (or VM) may host multiple applications or services or parts of multiple applications or services.

As a result of the complexities of the various factors associated with migrating applications or services from one host platform to another host platform, network administrators are often unaware of the impact of a migration configuration with regards to cost and performance. Even in cases where an estimate for the cost and performance is provided, the estimates are often highly inaccurate and misleading. Embodiments of the subject technology leverage the network migration system 100 shown in FIG. 1 to provide more accurate estimates of the costs and performance associated with a migration configuration.

Figure 4:
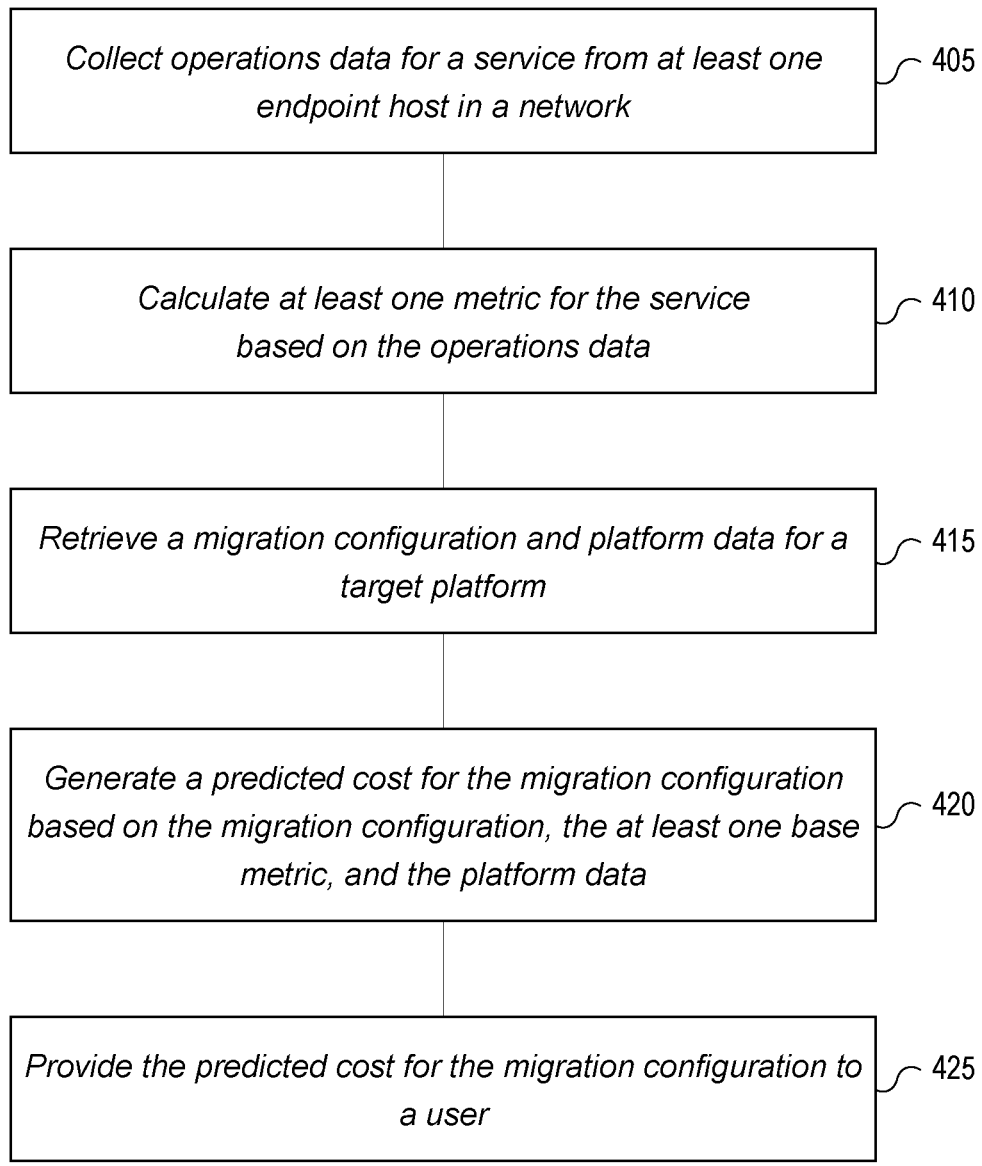
FIG. 4 shows an example process for assisting a network migration, in accordance with various embodiments of the subject technology.

FIG. 4 shows an example process 400 for assisting a network migration, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 400 can be performed by a network migration system or similar system.

At operation 405, the system collects operations data for a service from at one or more sensors. The sensors may be deployed on endpoints or other nodes in one or more networks and eventually provided to an analytics engine for processing (e.g., via collectors and a data mover as illustrated in FIG. 1). A service may be any logical construct configured to serve a function in the networking environment. In some cases more than one service may operate on a single physical machine in the networking environment. The service may be in the form of, for example, an application or portion of an application hosted on one or more endpoints managed by a network administrator, an endpoint group configured to serve a function, etc. In some embodiments, the sensors can perform some preprocessing of the network traffic and corresponding data before sending the data to the collectors. In other embodiments, the data may be processed at the collectors, data mover, and/or the analytics engine.

The collected operations data associated with one or more services in a network environment may include data flows (e.g., network traffic) between services, an amount of processor time needed by each service, an amount of memory needed for each service, an amount of storage/disk space needed for each service, a number (or listing) of host entities that the service runs on, identifiers or specifications for each host entity that the service runs on, or other computing resources needed for each service. The data flow information may be for one or more periods of time and include an amount of data transferred by a service, an amount of data received by the service, an amount of data transferred from the service to another specified service. The collected operations data. may be stored in a database in one or more records keyed to an identifier (e.g., a name or ID) for each service.

At operation 410, one or more metrics for the service is calculated based on the collected operations data. The metrics may include average values, max/min values, trends, or other metrics for collected operations data. The metrics may be based on the operation data for a service running on a particular host (e.g., an endpoint machine) and/or the service running across all hosts in the network environment.

At operations 415, the system may also retrieve a migration configuration and platform data for a target platform. The platform data may be retrieved from a third party via the network (e.g. a system associated with the target platform) and may include data associated with the target platform. For example, the platform data may include one or more physical locations where the target platform is located, pricing information for the target platform, target platform features and options, hardware and/or software specifications for host entities (e.g., endpoint machines, virtual machines, containers, etc.), or platform options. The pricing information may include flat fees, fees based on usage, fees based on features used, or a combination of various fees.

The migration configuration may be received from a network administrator. For example, the system may provide a user interface accessible via the network for a network administrator to alter a current configuration of networked entities and/or generate a migration configuration for the networked entities and submit the migration configuration to the system. According to other embodiments, the system may generate the migration configuration based on the collected operations data, metrics generated based on the operations data, the platform data, or other information. For example, the network administrator may provide additional preferences or constraints based on which one or more migration configurations may be generated.

At operation 420, the system generates a predicted cost for the migration configuration based on the migration configuration, the at least one generated metric, and the platform data. For example, the migration configuration may specify that a service (e.g., a web application) is to be migrated from a source platform (e.g., an enterprise network) to a destination platform (e.g., a cloud provider platform). The system may calculate, based on the operations data and the migration configuration, the amount of resourced needed at on the destination platform and determine, based on the platform data (e.g., hardware and/or software specifications for the destination platform) for the destination platform, how to effectively provision those resources on the destination platform.

Based on the provisioning and the pricing information for the destination platform, the system may calculate a predicted cost for the migration configuration. The predicted cost may include the cost of migrating the service from the source platform to the destination platform as well as operational costs of hosting the service on the destination platform over time. For example, the metrics calculated based on the received operations data may include an average amount of data transmitted to and from the service to be migrated for a billing period. Based on this information (and other such information), the system may calculate a predicted cost for the service to be migrated to the destination platform. According to some embodiments, the cost may also include a cost of power, compute/network resources, or other factors of an on-premise data-center.

In conventional systems, an accurate calculation of the cost of a migration is difficult to calculate because there was no access to this type of operations data. According to various embodiments of the subject technology, a more accurate calculation of the cost of migration can be obtained because the system is able to collect information regarding how much data is transmitted to and from a service. Because multiple services may reside on a single host entity, conventional systems were not able to accurately detect and collect this information. For example, embodiments of the subject technology are able to track data transmitted to and from one service (e.g., a web application) on a host entity to another service (e.g., a backend database application) residing on the same host entity. This data flow would not occur in the network and thus would not be visible to some implementations. However, the sensors discussed with respect to the embodiments of the subject technology are able to detect and monitor data flows such as these.

At operation 425, the system may provide the predicted cost for the migration configuration to the network administrator. For example, the system may provide a user interface accessible via the network for the network administrator view the predicted cost and other information relating to the migration configuration. For example, the system may also calculate a cost for a second configuration, generate a comparison between the cost of the first configuration and the second configuration, and provide the comparison to the user. The second configuration can be, for example, a current or existing configuration on the source platform or another configuration option. In some embodiments, the actual cost of operation of the current or existing configuration may be compared to the predicted cost for the migration configuration. The system may also provide a recommended configuration for a migration based on the predicted costs and comparisons of the costs.

In some cases, the migration of one or more services from an initial configuration to a second configuration may affect the performance of the services in ways that can be hard to predict. For example, moving services that may be collocated on the same host machine or in the same geographical location to another location of a destination host platform may introduce latency into the operations of the services. This increased latency may further cause additional operational effects (e.g., increased timeout events, etc.). In other cases, performance may be improved based on, for example, increased capabilities of the destination platform and/or moving services closer to other services that interact with the migrated services in order to reduce latency.

According to some embodiments, the system may further calculate one or more performance metrics based on the operations data, generated metrics, and the platform data. The performance metrics for the source platform and/or the existing configuration may be compared to the performance metrics for the destination platform and/or the migration configuration. The performance metrics and/or the comparison may be provided to a network administrator. Furthermore, the performance metrics and/or the comparison may be used to select a recommended migration configuration. This information may be valuable for resource planning and setting performance expectations.

Figure 5A:
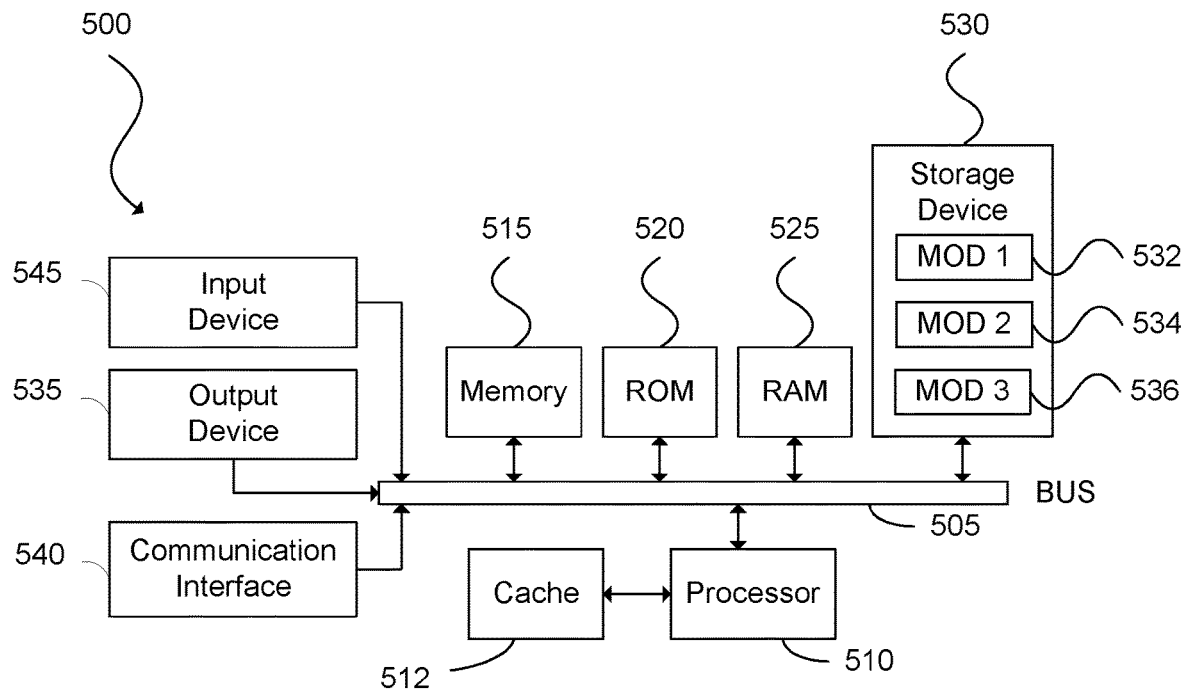
FIGS. 5A and 5B illustrate examples of systems in accordance with some embodiments.
Figure 5B:
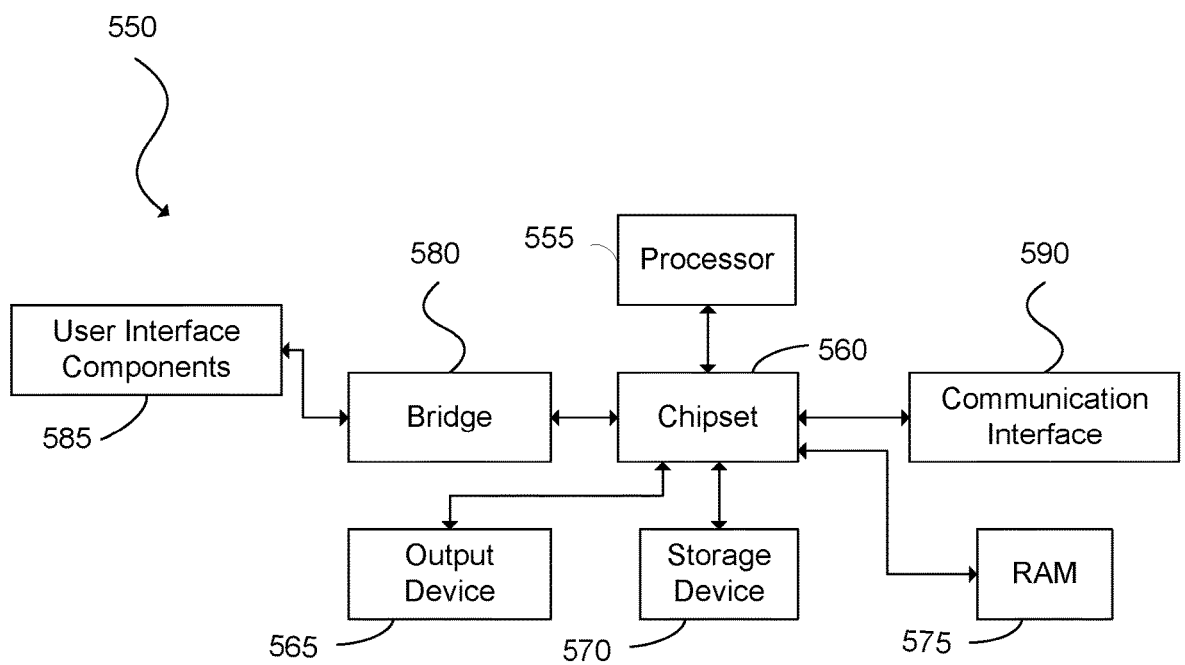

FIG. 5A and FIG. 5B illustrate systems in accordance with various embodiments. The more appropriate system will be apparent to those of ordinary skill in the art when practicing the various embodiments. Persons of ordinary skill in the art will also readily appreciate that other systems are possible.

FIG. 5A illustrates an example architecture for a conventional bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) in a storage device 520 and random access memory (RAM) 525, to the processor 510. The computing system 500 can include a cache 512 of high-speed memory connected directly with, in close proximity to, or integrated as part of the processor 510. The computing system 500 can copy data from the memory 515 and/or the storage device 530 to the cache 512 for quick access by the processor 510. In this way, the cache 512 can provide a performance boost that avoids processor delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

Storage device 530 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out the function.

FIG. 5B illustrates an example architecture for a conventional chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, and solid state media, for example. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 555 analyzing data stored in the storage device 570 or the RAM 575. Further, the computing system 500 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    collecting operations data for a service from at least one sensor deployed in an endpoint host executing the service in a network, the operations data comprising traffic flow information related to the endpoint host;
    calculating at least one metric for the service based on the operations data, wherein the at least one metric comprises one or more of average values, maximum values, minimum values, or trends related to the operations data;
    retrieving a migration configuration and platform data for a target platform;
    generating a predicted cost for the migration configuration based on the migration configuration, the at least one metric, and the platform data; and
    providing the predicted cost for the migration configuration to a user.

2. The method of claim 1, further comprising:
    calculating a current cost of a current configuration;
    generating a comparison between the current cost of the current configuration and the predicted cost for the migration configuration; and
    providing the comparison to the user.

3. The method of claim 1, wherein the migration configuration is received from a network administrator.

4. The method of claim 1, further comprising generating the migration configuration based on at least the operations data and the platform data.

5. The method of claim 1, wherein the operations data further comprises at least one of an amount of data transferred by the service, an amount of data received by the service, an amount of processor time needed by the service, an amount of memory needed for the service, an amount of storage needed for the service, a number of endpoint hosts on which the service runs, or specifications of the endpoint hosts on which the service runs.

6. The method of claim 1, wherein the platform data comprises at least one of location, pricing information, features, specifications for endpoint hosts, or platform options.

7. The method of claim 1, further comprising providing a recommended configuration for a migration based on the predicted cost for the migration configuration.

8. The method of claim 7, wherein the recommended configuration is the migration configuration.

9. The method of claim 1, further comprising:
    calculating a performance metric for the migration configuration based on the operations data and the platform data; and
    providing the performance metric for the migration configuration to the user.

10. The method of claim 1, wherein the operations data is generated by sensors at the at least one endpoint host.

11. The method of claim 1, wherein the endpoint host is one of a virtual machine, a container, a computing device.

12. A non-transitory computer-readable medium comprising instructions, the instructions, when executed by a computing system, cause the computing system to:
    collect operations data for a service from at least one sensor deployed in an endpoint host executing the service in a network, the operations data comprising traffic flow information related to the endpoint host;

calculate at least one metric for the service based on the operations data, wherein the at least one metric comprises one or more of average values, maximum values, minimum values, or trends related to the operations data;

retrieve a migration configuration and platform data for a target platform;

generate a predicted cost for the migration configuration based on the migration configuration, the at least one metric, and the platform data; and provide the predicted cost for the migration configuration to a user.

13. The non-transitory computer-readable medium of claim 12, wherein the instructions further cause the computing system to:

calculate a current cost of a current configuration;

generate a comparison between the current cost of the current configuration and the predicted cost for the migration configuration; and provide the comparison to a network administrator.

14. The non-transitory computer-readable medium of claim 12, wherein the instructions further cause the computing system to generate the migration configuration based on at least the operations data and the platform data.

15. A system comprising:

a processor; and a non-transitory computer-readable medium storing instructions that, when executed by the system, cause the system to:

collect operations data for a service from at least one sensor deployed in an endpoint host executing the service in a network, the operations data comprising traffic flow information related to the endpoint host;

calculate at least one metric for the service based on the operations data, wherein the at least one metric comprises one or more of average values, maximum values, minimum values, or trends related to the operations data;

retrieve a migration configuration and platform data for a target platform;

generate a predicted cost for the second configuration based on the migration configuration, the at least one metric, and the platform data; and provide the predicted cost for the migration configuration to a user.

16. The system of claim 15, wherein the instructions further cause the system to:

calculate a current cost of a current configuration;

generate a comparison between the current cost of the current configuration and the predicted cost for the migration configuration; and provide the comparison to the user.

17. The system of claim 15, wherein the migration configuration is received from a network administrator.

18. The system of claim 15, wherein the instructions further cause the system to generate the migration configuration based on at least the operations data and the platform data.

19. The system of claim 15, wherein the instructions further cause the system to:

calculate a performance metric for the migration configuration based on the operations data and the platform data; and provide the performance metric for the migration configuration to the user.

* * * * *